United States Patent [19]

Gilmour

[11] Patent Number: 5,295,118
[45] Date of Patent: Mar. 15, 1994

[54] SYNTHETIC APERTURE SIDE-LOOKING SONAR APPARATUS

[75] Inventor: George A. Gilmour, Severna Park, Md.

[73] Assignee: Westinghouse Electric Corp., Pittsburgh, Pa.

[21] Appl. No.: 19,382

[22] Filed: Feb. 18, 1993

[51] Int. Cl.$^5$ .............................................. G01S 15/89
[52] U.S. Cl. ...................................................... 367/88
[58] Field of Search ............................................ 367/88

[56] References Cited

U.S. PATENT DOCUMENTS 4,088,978  5/1978  Gilmour ................................. 367/88
4,987,563  1/1991  Gilmour ................................. 367/88

Primary Examiner—Daniel T. Pihulic
Attorney, Agent, or Firm—D. Schron

[57] ABSTRACT

A synthetic aperture side-looking sonar which includes a receiver transducer array and two transmitter transducers. When the apparatus is at a first position, the forwarded transmitter transducer is provided with a signal of frequency F1 while the aft transmitter transducer is provided with a signal of frequency F2. At a subsequent position, the application of the frequencies to the transmitter transducers are reversed. At each location, the F1 and F2 returns are stored and combined with the returns of the subsequent transmission to form a plurality of receiver beams.

8 Claims, 9 Drawing Sheets

SYNTHETIC APERTURE SIDE-LOOKING SONAR APPARATUS

BACKGROUND OF THE INVENTION

1. Field of the Invention

The invention in general relates to sonar systems, and particularly, to an improved synthetic aperture multibeam side-looking sonar system.

2. Background Information

In side-looking sonar systems, apparatus on a carrier vehicle repetitively transmits acoustic pulses (pings) to sonify a target area. Acoustic energy reflected back from the target area impinges upon a multi-element elongated receiver transducer, and beam forming circuitry creates a plurality of receiver beams such that the energy reflected from adjacent narrow strips on the target area may be portrayed as a line-by-line picture that is a pattern of highlights and shadows, analogous to an optical viewed panorama illuminated by side lighting, with objects outlined in such a way as to permit their identification.

There is considerable interest in applying the principles of synthetic aperture side looking radar to side looking sonar systems. A synthetic aperture system is based upon the generation of an effectively long antenna or receiver transducer by signal processing means rather than by the actual use of a physically long antenna or transducer. In synthetic aperture side-looking sonar systems, a multi-element receiver transducer is moved to take up sequential positions along a course line, and during movement, acoustic transmissions take place whereby the energy reflected back from the target area causes the transducer elements to provide respective output signals which are stored. After a predetermined number of sequential pings during the course of travel, all of the stored signals are suitably processed to form a plurality of synthetic aperture beams each having a higher resolution due to the longer aperture than the real aperture beam.

With the present invention, faster forward travel is possible and less processing circuitry is required as compared with conventional synthetic aperture sonar systems, and further, the arrangement allows for a synthetic aperture retrofit for various existing side-looking sonar systems.

SUMMARY OF THE INVENTION

Synthetic aperture side-looking sonar apparatus in accordance with the present invention includes an elongated side-looking sonar receiver transducer having a forward end and an aft end and being of a length L. This transducer is made up of a plurality of elements arranged end to end with each providing a respective output signal in response to reflected acoustic energy from a target area, sonified by repetitive acoustic transmissions during travel over the target area. The apparatus includes first and second transmitter transducers each being of a smaller length than the receiver transducer and in general of a length equal to the length of each element of the receiver transducer. The transmitter transducers are respectively positioned proximate the forward and aft ends of the transducer and are separated by a distance t.

A transmitter means provides a first transmitter signal of frequency F1 and a second transmitter signal of frequency F2 and simultaneously applies the F1 signal to the first transmitter transducer and the F2 signal to the second transmitter transducer for propagation of acoustic energy when the apparatus is at a position along the course of travel. The transmitter means is operable when the apparatus is at a next subsequent position to reverse the application of the F1 and F2 signals so as to apply the F1 signal to the second transmitter transducer and the F2 signal to the first transmitter transducer. Thereafter, at each next subsequent position, the application of the F1 and F2 signals are reversed from that of the previous position.

A receiver means receives reflected acoustic energy resulting from the acoustic transmissions and stores the output signals of the elements from one transmission and combines them with the output signals resulting from the next transmission to form a plurality of receiver beams, characterized by respective beam signals. A means, such as a display, is provided for utilizing the generated beam signals.

DESCRIPTION OF THE PREFERRED EMBODIMENT

Figure 1:
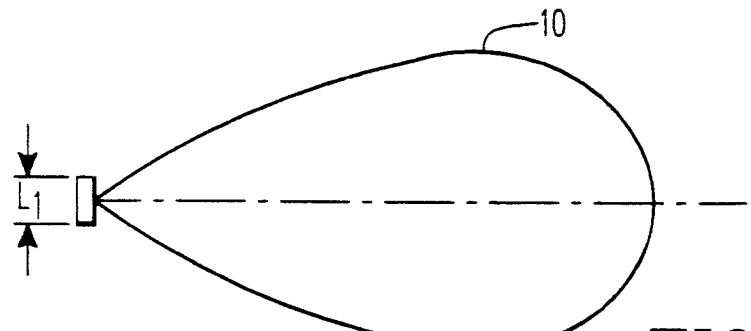
FIG. 1 illustrates a plan view of a beam pattern obtained with an antenna or transducer of length $L_1$.

FIG. 1 illustrates a plan view of a beam pattern 10 obtained with a transducer of length $L_1$. The far field beam width $\beta$ is given by the relationship $\beta \approx \lambda/L$ where $\lambda$ is the wavelength of the energy transmitted and/or received and L is the length of the transducer.

Figure 2:
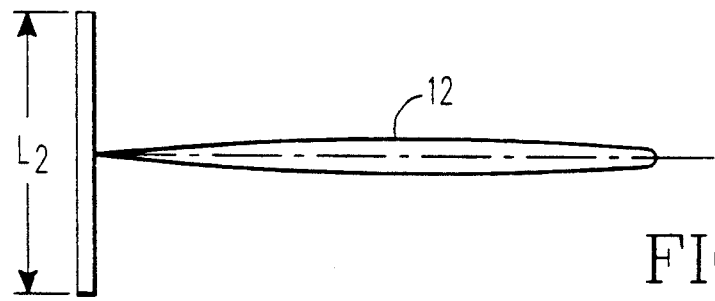
FIG. 2 illustrates the beam pattern obtained with a relatively longer antenna or transducer of length $L_2$.

In accordance with the above formula, for a given wavelength, as the length of the transducer increases, the beam width decreases, as illustrated in FIG. 2 wherein the relatively narrow beam 12 is provided by the relatively longer transducer of length $L_2$.

In a synthetic aperture system, a relatively narrow beam such as illustrated in FIG. 2 is obtained with a relatively short transducer such as illustrated in FIG. 1.

Figure 3:
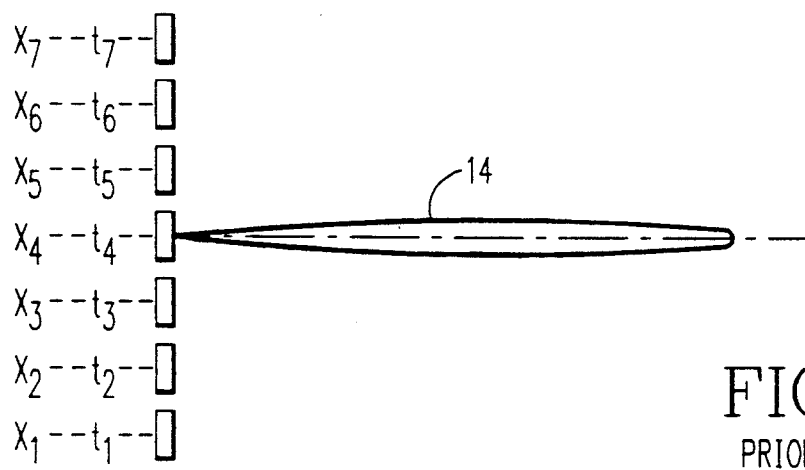
FIG. 3 illustrates the principles of the formation of a synthetic aperture beam.

The principle is illustrated in FIG. 3 wherein the relatively short transducer is illustrated at position $X_1$ at time $t_1$ and for subsequent positions at subsequent points in time. Let it be assumed that the length of the transducer in FIG. 3 is $L_1$ as in FIG. 1. By storing the received signals from each of the transmission at times $t_1$ through $t_7$ at corresponding positions $X_1$ through $X_7$, and coherently adding the stored signals, the transducer of FIG. 2 is simulated, thereby resulting in the narrow beam 14 illustrated in FIG. 3.

Figure 4:
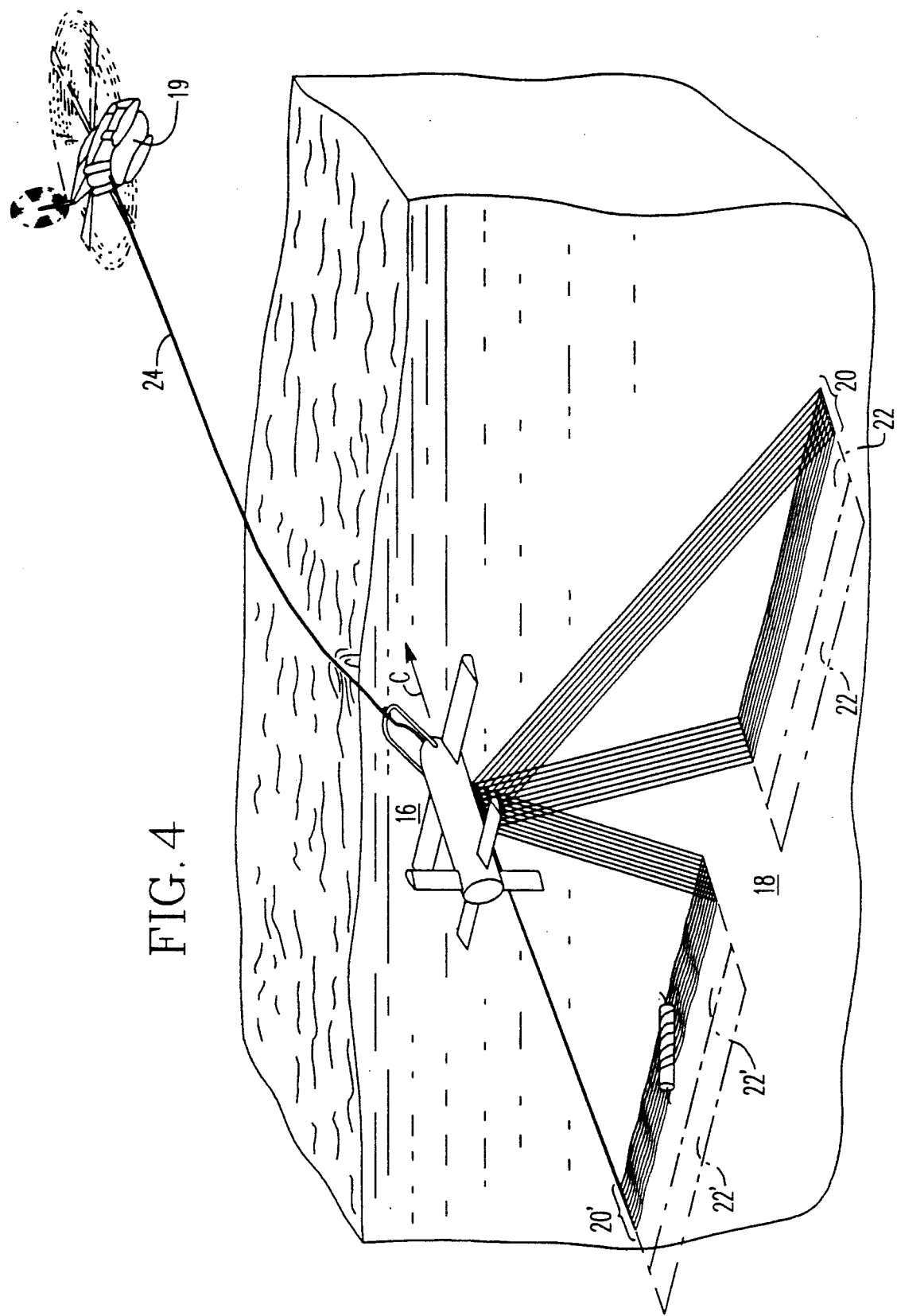
FIG. 4 illustrates a towed carrier multi-beam side-looking sonar system.

FIG. 4 illustrates a multi-beam side-looking sonar system carried by an underwater vehicle 16 which is towed along a course line C over a target area 18, such as the bottom of a body of water, by means of a tow vehicle in the form of helicopter 19.

During travel over the target area repetitive acoustic transmissions take place and a plurality of receiver beams are formed for obtaining a side-looking sonar picture of the target area. For greater coverage, the system will generally employ both starboard beams 20 and port beams 20'. Processed signals are transmitted via cable 24 to display equipment on the towing vehicle 19.

Figure 5:
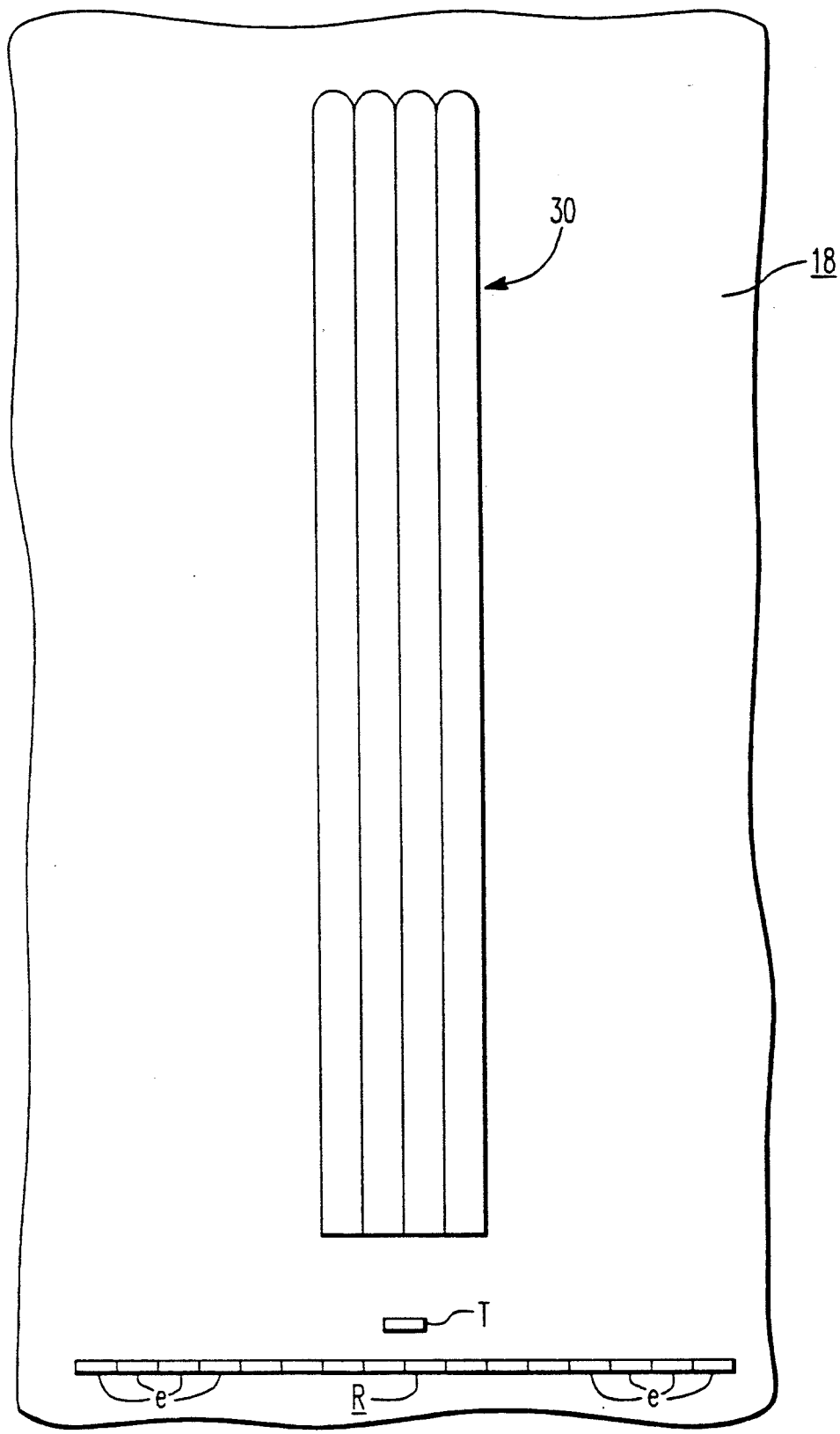
FIG. 5 illustrates a plurality of formed receiver beams superimposed upon a previously sonified region of a target area and additionally shows a transducer arrangement of the prior art.

In FIG. 5, a transmitter transducer T is energized periodically to transmit a pulse of acoustic energy having a certain frequency to sonify a portion of the target area 18. Reflected acoustic returns are picked up by a receiver transducer R made up of individual transducer elements e arranged end to end. In response to this reflected energy, the elements provide respective output signals which are processed to form a plurality of receiver beams 30. In some applications, a particular carrier may not be able to accommodate the length of the receiver transducer R. In such instance, synthetic aperture techniques may be used wherein multiple adjacent beams may be formed having the same resolution as those in FIG. 5, however, with a receiver transducer of half the length.

Figure 6:
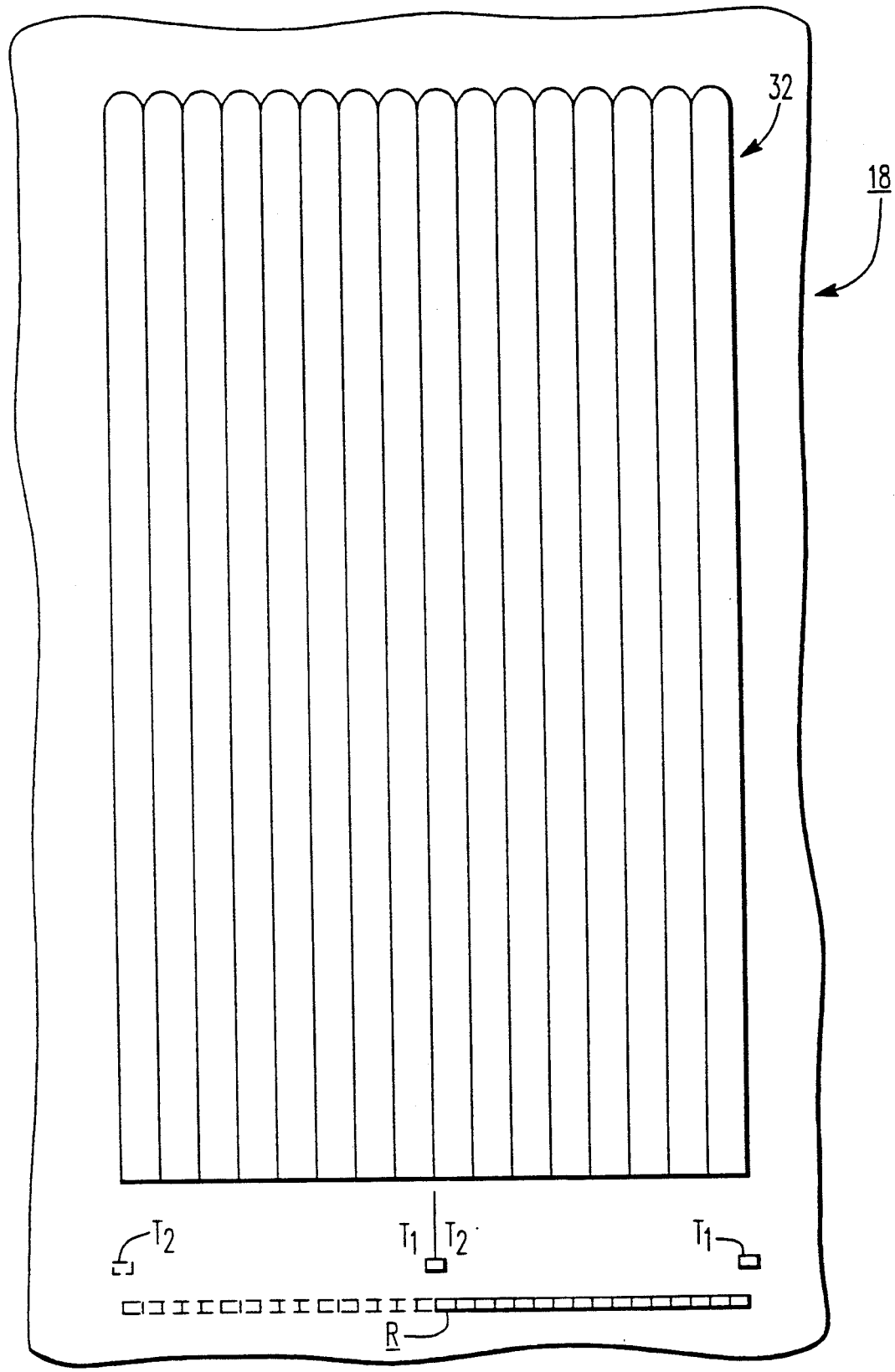
FIG. 6 is another prior art system similar to FIG. 5 however, with the beam formation being performed utilizing synthetic aperture techniques.
Figure 6A:
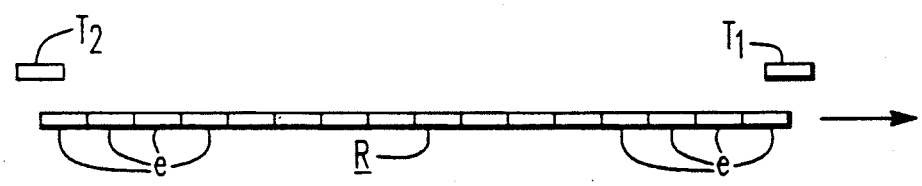
FIG. 6A illustrates the transducer arrangement of FIG. 6 in more detail.

One type of apparatus for forming synthetic aperture receiver beams is illustrated in FIG. 6 wherein a receiver transducer R is shown in its present position in solid lines and in a previous position, in dotted lines. With additional reference to FIG. 6A, the receiver transducer R is half the length of that illustrated in FIG. 5, but contains the same number of transducer elements e. Two transmitter transducers are utilized, $T_1$ located proximate the forward end of receiver transducer R, and $T_2$ located proximate the aft end.

In FIG. 6, when the transducer is in the dotted position, the forward transducer $T_1$ projects acoustic energy of a given frequency and returns are picked up by the elements and stored. The stored signals are combined with received signals produced when the transducer is in the solid line position (where $T_1$ and $T_2$ would overlap) at which point projector $T_2$ projects acoustic energy of the same frequency as before. Thereby the length of the transducer illustrated in FIG. 5 is simulated to produce a plurality of receiver beams 32.

In the present invention the receiver transducer is used with a length equivalent to that illustrated in FIG. 6, however, with half as many elements thereby requiring less signal processing channels to form receiver beams. In addition, the elements of the receiver transducer are of a length compatible with various existing equipment so that retrofitting is readily accomplished. FIG. 7 illustrates the transducer apparatus in solid lines at a particular position to the left of which, as shown dotted, is the apparatus in a previous position, and to the right of which, in dotted lines, is shown the apparatus in the subsequent position.

Figure 7A:
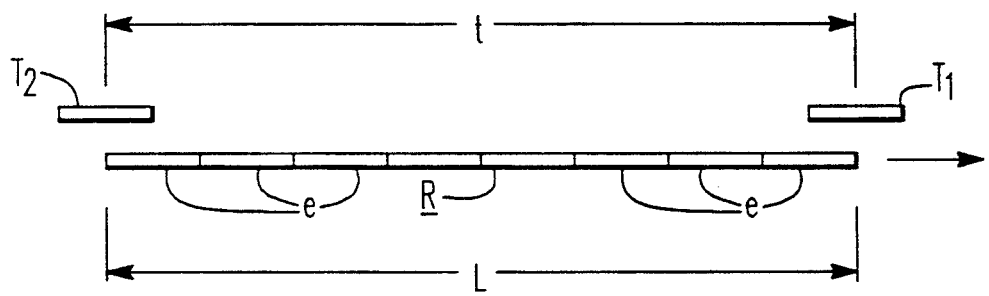
FIG. 7A illustrates the transducer arrangement of FIG. 7 in more detail.
Figure 7:
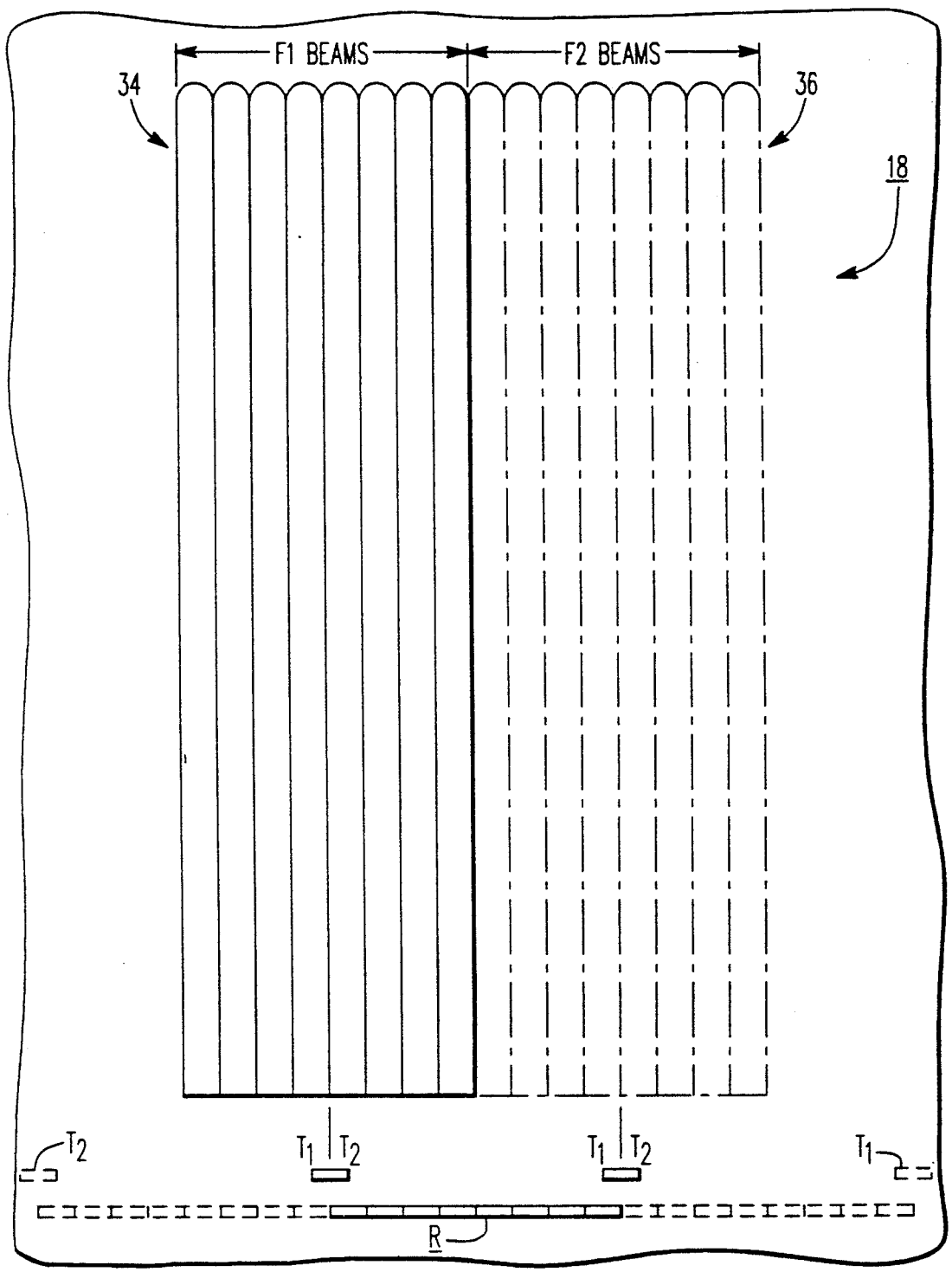
FIG. 7 is a view similar to FIGS. 5 and 6 illustrating the formation of receiver beams utilizing the present invention.

FIG. 7A illustrates the transducer apparatus in more detail and is seen to include a receiver transducer R having a plurality of elements e and additionally shows first and second transmitting transducers $T_1$ and $T_2$ located proximate the forward and aft ends of the receiver transducer R. The receiver transducer is of a length L and in one embodiment the distance between the transmitting transducers is t, with each transmitting transducer being arranged to respectively overlap the first and last element of the receiver transducer.

Accordingly, in FIG. 7, with the three positions illustrated, there is an overlap of the forward and aft transducers $T_1$ and $T_2$. With the present invention, two different transmitting frequencies F1 and F2 are utilized with the F1 signal being applied to one transmitting transducer while the F2 is applied simultaneously to the other transmitting transducer and then the applied frequencies are reversed for a subsequent receiver transducer position. This operation is illustrated in FIG. 8 wherein the transducer apparatus is illustrated at four different positions and at each position, the transducers have been offset from the previous position for clarity, although it is to be understood that at all times, the transducers travel along the line C.

By way of example, when at position 1, the forward transducer $T_1$ transmits at a frequency F1, while the aft transducer $T_2$ simultaneously transmits a signal at a frequency F2. At position 2, the aft transducer $T_2$ which previously transmitted a signal F2 now transmits a signal F1 and the forward transducer $T_1$ which in position 1 transmitted a signal F1 now transmits a signal F2. As illustrated in FIG. 8, at each subsequent position, the application of the F1 and F2 signals to the forward and aft transducers are reversed from a previous position.

Figure 8:
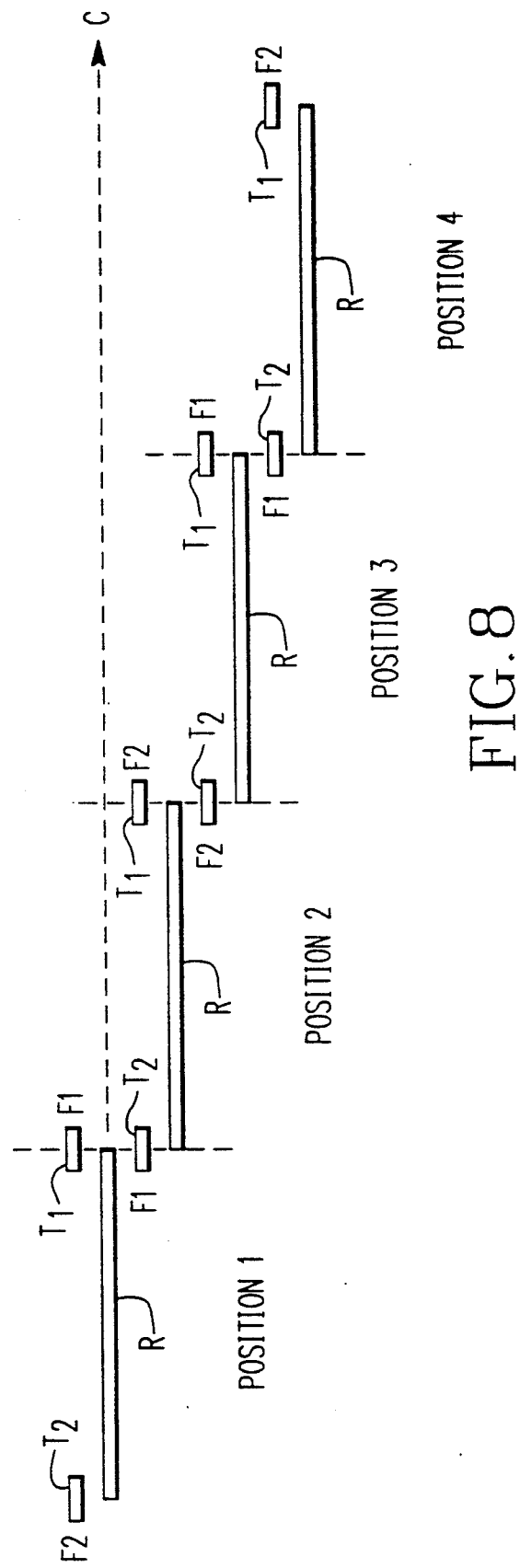
FIG. 8 illustrates the transmitter and receiver transducers of FIG. 7 offset at different positions in the course of travel over the target area.

With the operation as demonstrated in FIG. 8, and with reference once again to FIG. 7, F1 return signals are received by the transducer elements when in the left-most position and are combined with F1 signals resulting from a second F1 transmission when the transducer is in the middle position illustrated, to thus form a plurality of receiver beams 34 termed the F1 beams. Simultaneously, however, with the F1 signal transmission in the middle position, F2 is also transmitted and is again transmitted, when the transducer is in the right-most position, thus repeating the process for the formation of plurality of F2 receiver beams 36 designated as the F2 beams. At subsequent positions, F1 beams and F2 beams are generated and are utilized to detect targets in the target area.

Figure 9:
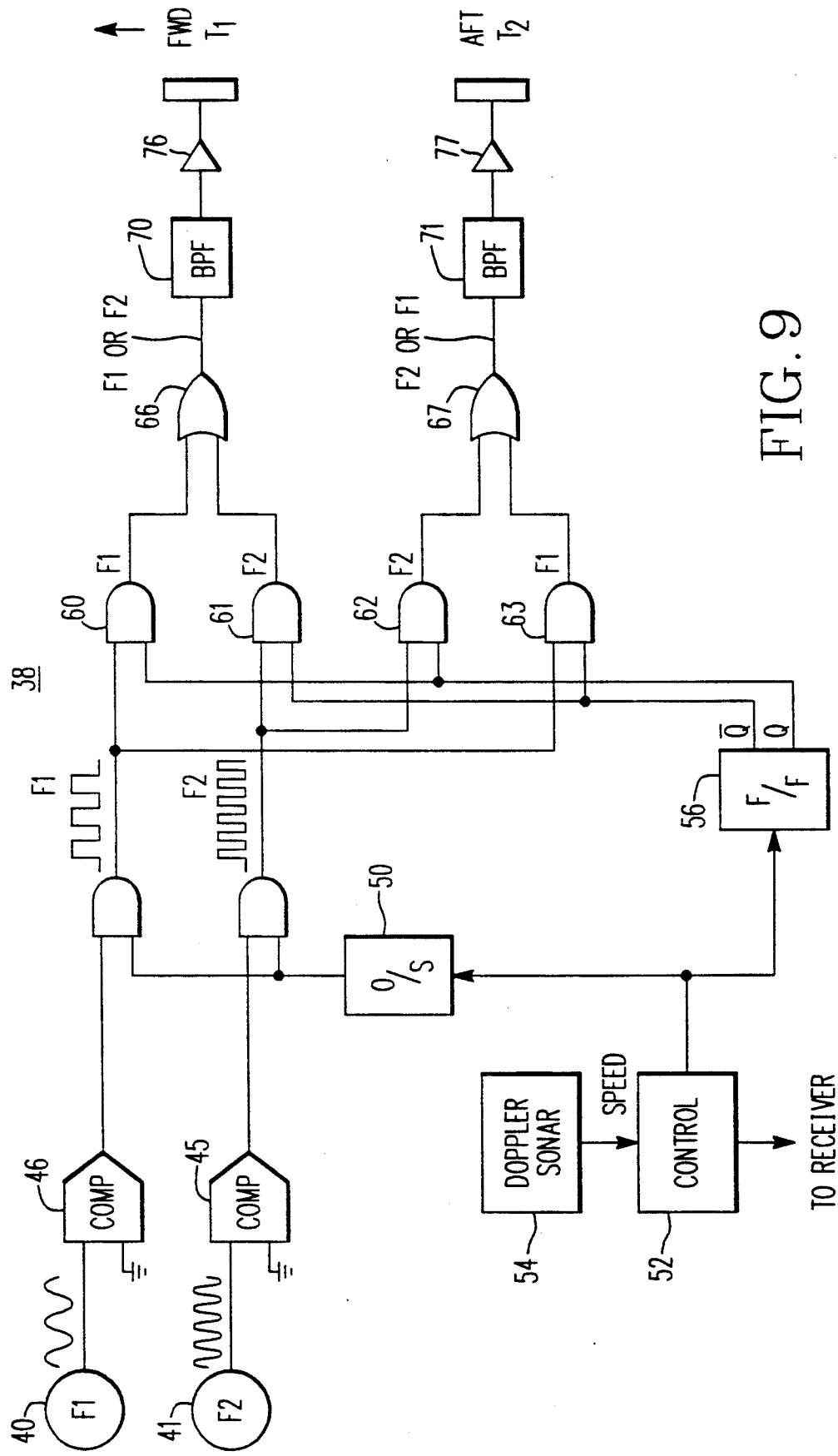
FIG. 9 is a block diagram illustrating one embodiment of a transmitter arrangement which may be utilized herein.

FIG. 9 is a block diagram illustrating, by way of example, a transmitter means for the simultaneous transmission of two different frequencies. The transmitter 38 includes first and second oscillators 40 and 41 for providing sinusoidal signals of respective different frequencies F1 and F2. These sinusoidal signals are converted to respective square wave signals of frequencies F1 and F2 in comparators 44 and 45, the output signals of which are provided to respective AND gates 46 and 47.

When enabled by the output of a one shot multivibrator 50, the arrangement ensures that the AND gate output signals commence with a positive going pulse. The one shot 50 is triggered by the output of control circuit 52 which is provided with an input indicative of the speed of the carrier apparatus to initiate the multiple acoustic transmissions which take place as the carrier proceeds over a target area. The speed indicative signal may be provided by conventional Doppler sonar 54.

Control 52 is also operable to initiate operations in the receiver, to be described, and to trigger flip flop 56 to a set and reset state of operation on alternate transmissions whereby an enabling signal is alternately provided on outputs Q and $\bar{Q}$. The enabling signals, along with the F1 and F2 signals are provided to a series of AND gates 60–63. More particularly, the Q output of flip flop 56 is provided to AND gate 60 and 62 which respectively receive F1 and F2 signals. The $\bar{Q}$ output of flip flop 56 is provided to AND gate 61 and 63 also respectively receiving the F2 and F1 signals.

When Q is high, AND gate 60 is enabled to pass frequency F1 and AND gate 62 is enabled to pass frequency F2. The signals are applied to the respective forward and aft transmitter transducers $T_1$ and $T_2$ after passing through respective OR gates 66 and 67, band pass filters 70 and 71, the output signals of which are amplified by amplifiers 75 and 76 prior to application to the transmitting transducers. On a subsequent transmission the output state of flip flop 56 is reversed such that the $\bar{Q}$ output is high to enable AND gates 61 and 63 to respectively pass signals F2 and F1 to reverse the application of the F1 and F2 signals from that of the previous transmission corresponding to the previous position. In the next transmission, the application of the F1 and F2 signals will again reverse as will be the case on all subsequent transmissions.

Figure 10:
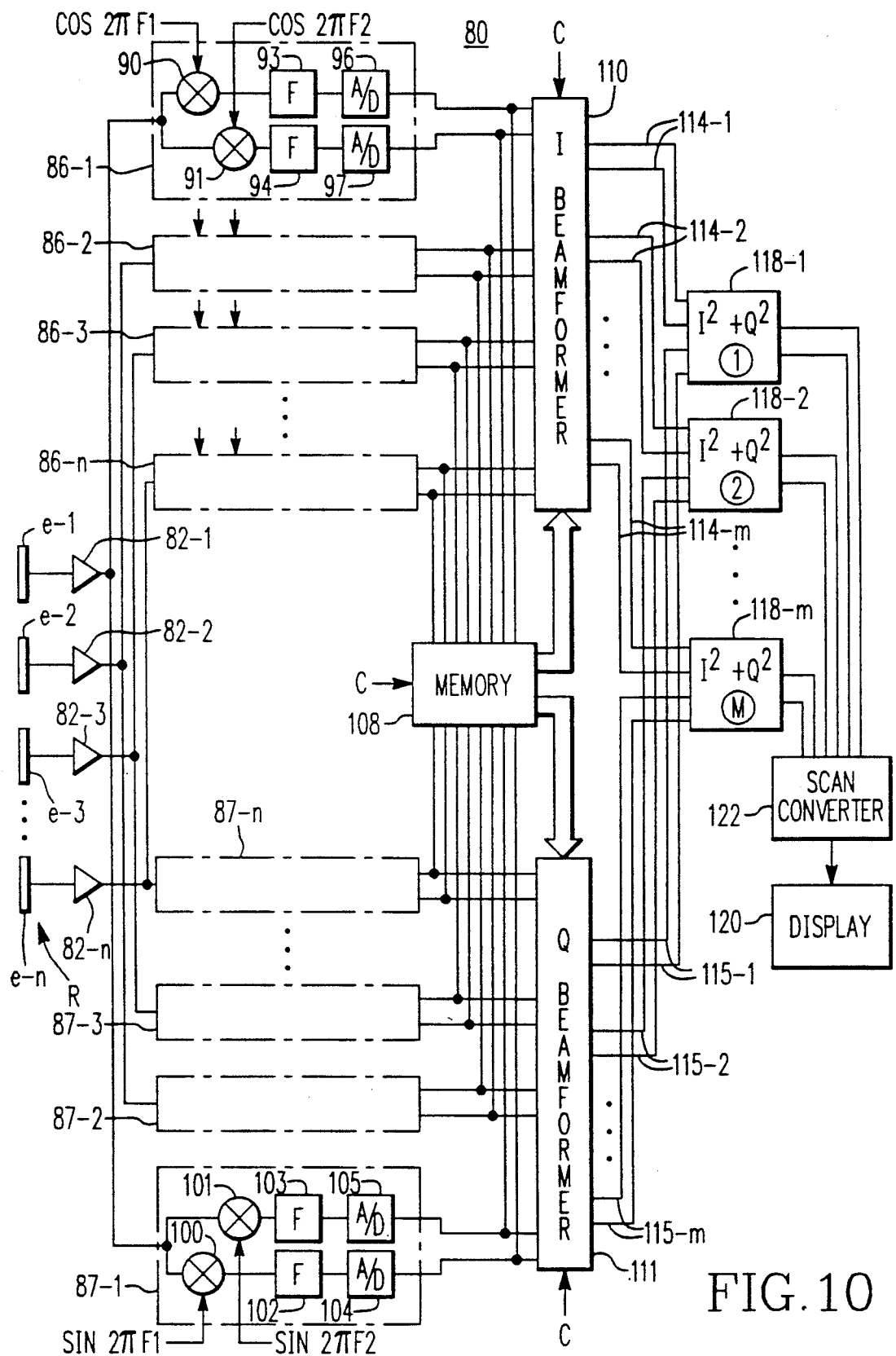
FIG. 10 illustrates one embodiment of a receiver arrangement which may be utilized herein.

FIG. 10 illustrates the basics of one type of receiver which may be utilized for processing acoustic returns. The receiver 80 will be illustrated by way of example to process the signals by well known digital techniques utilizing in-phase (I) and quadrature (Q) components.

The receiver transducer R includes a plurality of elements e-1 to e-n, the output signals of which are provided to respective preamplifiers 82-1 to 82-n. The I and Q components are obtained through multiplication by respective cosine and sine functions. Accordingly, for the I function, a plurality of I signal processing channels 86-1 to 86-n are connected to the outputs of preamplifiers 82-1 to 82-n as are Q signal processing channels 87-1 to 87-n.

In the present invention, two different frequencies are transmitted and accordingly two cosine functions are provided as illustrated by the exemplary signal processing channel 86-1. The transducer element output signal is applied to two mixers 90 and 91 which multiply the transducer signals by respective functions $\cos 2\pi F1$ and $\cos 2\pi F2$. The results of the multiplication include a plurality of frequencies which are undesired and these frequencies are removed by filters 93 and 94 which pass the desired I signals for frequencies F1 and F2. Conversion of these analog signals to digital form take place in analog-to-digital converters 96 and 97 which are operable to sample the signal in range increments as may be governed by the control circuit 52 (FIG. 9).

In a similar fashion, the digital representation of the F1 and F2 Q components are obtained by multiplying the element signals by $\sin 2\pi F1$ and $\sin 2\pi F2$ as illustrated in Q signal processing channel 87-1. This latter signal processing channel includes mixers 100 and 101, filters 102 and 103, and analog-to-digital converters 104 and 105.

The I and Q F1 and F2 processed signals are stored in a memory 108 and are also applied to respective I and Q digital beamformers 110 and 111. These beamformers may also receive an input from control 52 so as to effectively change the curvature of the receiver array as a function of time to accomplish all range focusing. The data supplied to the beamformers from the I and Q signal processing channels represent the current receiver element output signals and the signals provided by memory 108 represent the signals from the previous transmission. The signals are combined in the beamformers to accomplish the synthetic aperture formation of m beams. Each pair of beamformer output lines 114-1 to 114-m provide the respective I input for the F1 and F2 signals. Similarly, each pair of Q beamformer output lines 115-1 to 115-m provide the F1 and F2 Q components.

All of the beamformer output signals are squared and the squared I and Q components for the respective beams are added in circuits 118-1 to 118-m, the output signals of which represent the F1 and F2 beam signals. These signals are provided to a utilization means such as a display 120 after first being prepared for display presentation by means of a conventional scan converter 122.

Figure 11:
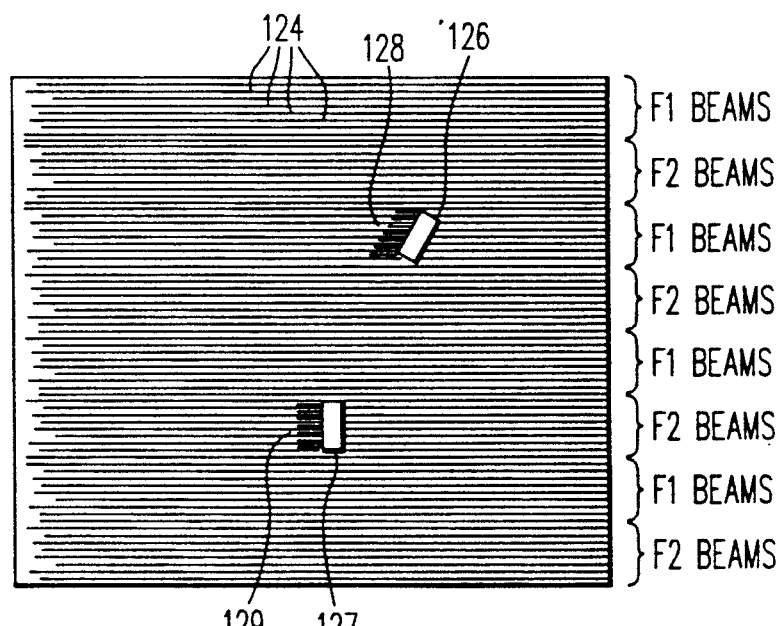
FIG. 11 illustrates a typical display.

A typical display 120 is illustrated in FIG. 11 and will, under control of the scan converter, present a moving window display as though the target area were viewed through a window as the apparatus proceeds along its course line. Individual scan lines 124 are the result of individual beam signals and, under control of scan converter 122, are presented at alternate blocks of F1 and F2 beams. Two targets 126 and 127 are illustrated and show up as a highlight followed by an acoustic shadow, 128 and 129.

I claim:

1. Synthetic aperture side looking sonar apparatus comprising:
   a) an elongated side looking sonar receiver transducer having a forward end and an aft end and being of a length L;
   b) said receiver transducer being made up of a plurality of elements, arranged end to end and each providing a respective output signal in response to reflected acoustic energy from a target area sonified by repetitive acoustic transmissions during travel over said target area;
   c) first and second transmitter transducers each of a length <L, respectively positioned proximate said forward and aft ends of said receiver transducer and separated by a distance t;
   d) transmitter means operable to provide a first transmitter signal of frequency F1 and a second transmitter signal of frequency F2 and to simultaneously apply said F1 signal to said first transmitter transducer and said F2 signal to said second transmitter transducer for propagation of acoustic energy, when said apparatus is at a position along said course of travel;
   e) said transmitter means being additionally operable, when said apparatus is at a next subsequent position to reverse the application of said F1 and F2 signals so as to apply said F1 signal to said second transmitter transducer and said F2 signal to said first transmitter transducer, and thereafter at each next subsequent position to reverse said application of said F1 and F2 signals from that of the previous position;
   f) receiver means operable to receive reflected acoustic energy resulting from said acoustic transmissions and to store the output signals of said elements from one transmission and combine them with the output signals resulting from a next transmission to form a plurality of receiver beams, characterized by respective beam signals; and g) means for utilizing said beam signals.

2. Apparatus according to claim 1 wherein:
a) the distance from one said position to a next subsequent position is L.

3. Apparatus according to claim 1 wherein:
a) the separation distance, t, of said transmitter transducers is equal to the length L of said receiver transducer.

4. Apparatus according to claim 1 wherein:
a) the length of each said transmitter transducer is equal to the length of an element of said receiver transducer.

5. Apparatus according to claim 1 wherein:
a) the centers of said transmitter transducers are positioned over respective ends of said receiver transducer.

6. Apparatus according to claim 1 wherein:
a) said means for utilizing is a display.

7. Apparatus according to claim 1 wherein said transmitter means includes:
a) first and second oscillators for providing sinusoidal signals of frequencies F1 and F2, respectively;
b) means for converting said sinusoidal signals to square wave signals of frequencies F1 and F2;
c) first gating operable upon each said transmission to gate said square wave signals for a predetermined period of time and to ensure that each said signal is gated commencing with a leading edge; and
d) second gating means operable to alternately apply said F1 and F2 signals to said transmitter transducers upon alternate transmissions.

8. Apparatus according to claim 1 wherein said receiver means includes:
a) means for filtering and separating said output signals of said elements to derive signals which are the result of acoustic returns from the transmission of F1 and F2 signals.

* * * * *